United States Patent [19]

Bieri

[11] 4,055,353

[45] Oct. 25, 1977

[54] CLAMPING DEVICE, ESPECIALLY FOR ROCK OR CONCRETE DRILLS

[75] Inventor: Hans Bieri, Pfaeffikon, Switzerland

[73] Assignee: Hydrostress Aktiengesellschaft, Pfaeffikon, Switzerland

[21] Appl. No.: 714,772

[22] Filed: Aug. 16, 1976

[30] Foreign Application Priority Data

Aug. 19, 1975 Switzerland .................... 10765/75

[51] Int. Cl.² .................................... B23B 27/00

[52] U.S. Cl. .................................... 279/2 R; 242/68.2

[58] Field of Search ............... 279/2 R; 242/72, 72.1, 242/68.2, 68.3

[56] References Cited

U.S. PATENT DOCUMENTS

| | | | |
|---|---|---|---|
| 2,749,133 | 6/1956 | Rich | 242/68.2 X |
| 2,830,821 | 4/1958 | Bystrom | 242/68.2 X |
| 2,992,787 | 7/1961 | Craig | 242/68.2 |
| 3,345,006 | 10/1967 | Geen | 242/68.2 X |
| 4,000,666 | 1/1977 | Schulz | 242/68.2 X |

*Primary Examiner*—Othell M. Simpson
*Assistant Examiner*—W. D. Bray
*Attorney, Agent, or Firm*—W. G. Fasse; W. W. Roberts

[57] ABSTRACT

The present clamping device is intended for releasably connecting a driving member, such as a shaft driving a drill bit, in a force transmitting manner to a tubular driven member, such as the boring pipe or tube. A clamping body fits into the free end of the tubular member in a centering manner. The drill shaft may be secured to the centering, clamping body, for example, by a threading. The centering body has a ring groove which receives a clamping ring having a wedging slot extending axially through the clamping ring. A wedge may be forced into the wedging slot by means of a screw, whereby the clamping ring is expanded radially outwardly to connect the centering clamping body to the tubular member.

9 Claims, 3 Drawing Figures

CLAMPING DEVICE, ESPECIALLY FOR ROCK OR CONCRETE DRILLS

BACKGROUND OF THE INVENTION

The present invention relates to a clamping or chucking device, especially for rock or concrete drills with a drilling pipe or tube. The clamping device permits the detachable or releasable connection of a drive shaft, for example, driving a drill bit such as a drilling pipe.

The present invention is especially useful in connection with hollow rock drills constructed to remove a core from the rock or concrete. In this type of drilling equipment there exists the problem that the drill bit, or rather the drilling crown must be replaced, since it is subject to wear and tear. Preferably, the replacement should be accomplished by a mechanism permitting the simple and rapid exchange and avoiding welded or soldered connections. Further, it is desirable, that any such mechanism should be usable repeatedly.

OBJECTS OF THE INVENTION

In view of the foregoing, it is the aim of the invention to achieve the following objects, singly or in combination:

to construct a clamping mechanism in such a manner that the drilling bit or crown may be rapidly secured to the end of a tubular drive member, whereby simultaneously a proper centering is accomplished;

to construct the clamping mechanism in such a manner that it may be used repeatedly; and to combine basic, simple elements in the clamping mechanism, so that wear and tear will be reduced and the clamping mechanism will have a prolonged, useful life.

SUMMARY OF THE INVENTION

According to the invention, the above objectives have been achieved by means of a clamping device which is characterized by a centering body, which fits into the open end of a tubular drilling pipe on the one hand, and which receives, for example, in a threading, the drive shaft for a drill bit or a drill crown. The centering body is provided with a circumferential ring groove in which there is received a clamping ring extending radially outwardly against the inner surface of the drill pipe. The clamping ring is provided with a slot in which there is received a wedge shiftable in the axial direction by means of a clamping screw which extends through the centering body and into the wedge. By tightening the screw, the clamping ring is spread radially outwardly against the inner surface of the drilling pipe, thereby interconnecting the clamping mechanism and the drilling pipe in a force transmitting manner. The clamping ring is sufficiently elastic to release the force transmitting connection when the clamping screw is rotated to move the wedge in the opposite direction.

The combination of the above features as taught by the invention has the advantage that the drive shaft may be rapidly separated from the drilling pipe, and that in the connected or mounted condition, the proper centering between the drilling pipe and the drive shaft is assured. Still another advantage is seen in that the entire structure of the clamping mechanism is relatively simple.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
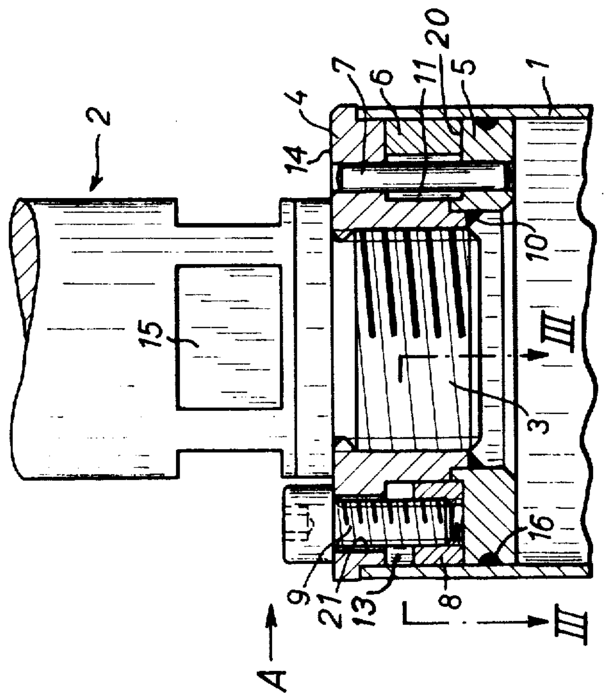
FIG. 1 shows an axial section through the clamping device according to the invention.
Figure 3:
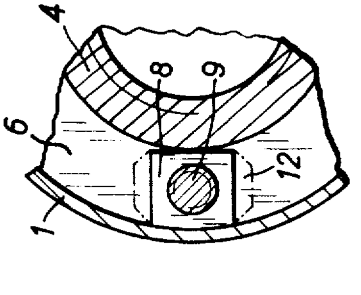
FIG. 3 is a partial sectional view through the apparatus along the section line III—III in FIG. 1.

FIG. 1 shows, partially in section, the drilling pipe 1 constituting a tubular member to the free end of which there is connected a clamping device which in turn holds a driving shaft 2 for driving a drill crown or the like, which is secured to the lower end of the drilling pipe 1. The drilling crown itself is not shown, since it is not part of the invention. The drive shaft 2 is connected to a centering body 4, by a threading 3 or the like. Since the drilling pipe 1 is hollow, the drill crown of hard metal or diamond inserts may be used to remove cores from drilled holes in rock, concrete, or other hard structure materials.

If it becomes necessary to replace the drilling pipe 1, for example, due to the fact that the drilling crown has been worn out, the clamping device, according to the invention, permits the exchange in a rapid manner, simply by untightening the rapid clamping device. For this purpose, the present device comprises a centering body 4 having a top flange with a shoulder 18. The centering body 4 fits, preferably snuggly, into the free end of the pipe 1, whereby the shoulder 18 rests against the upper facing end of the pipe 1. The centering body 4 comprises an upper flange section and an axially extending cyclindrical section, the lower end of which is rigidly secured to a centering member, such as a ring 5, which also forms a flange and which, for example, is welded by a welding bead 10 to the cylindrical portion of the centering body. The centering member 5 has an outer diameter which snuggly fits into the bore of the drilling pipe 1.

To provide a good seal against any leakage of cooling water, the centering member 5 is provided with a circumferential groove facing the inner surface of the drilling pipe 1, with a sealing ring 16 located in said groove.

The centering body 4 and the centering member 5 define circumferential ring space 20 in which there is received a clamping ring 6, for example, made of spring steel as a single piece, unitary structure. The spring steel of the ring 6 provides the ring 6 with an inherent elasticity which permits the clamping ring 6 to return into a position allowing the withdrawal of the clamping device from the pipe 1 when the clamping screw 9 is released as will be described in more detail below. The dimensions of the ring space 20 and the clamping ring 6 are such that the ring fits practically without play into the groove. The clamping ring 6 is provided with a wedging slot 13 which in section has a substantially conical shape with lateral, slanted spreading surfaces 12, which slant upwrdly so that the spacing between the spreding surfaces 12 decreases in the axial, upward direction. A wedge 8 is located in the wedging slot 13.

Figure 2:
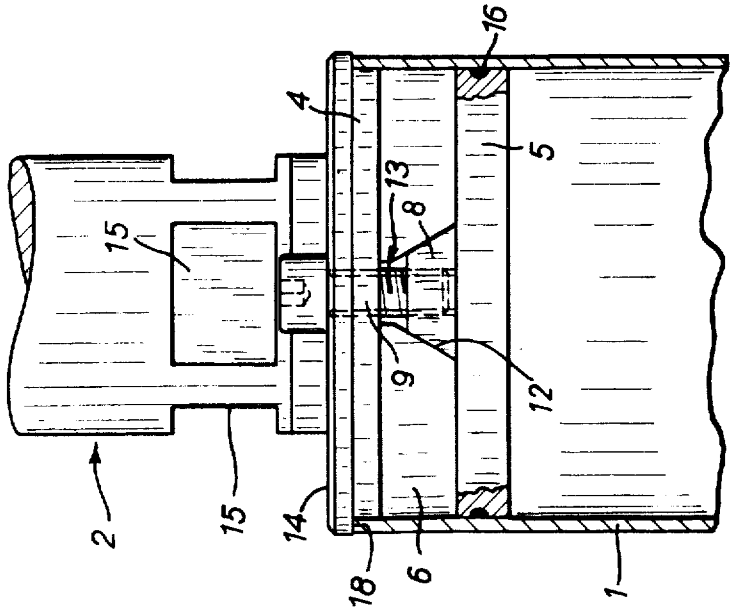
FIG. 2 shows a view in the direction of the arrow A in FIG. 1, with the drilling pipe in section, and the entire arrangement rotated by 90°, relative to FIG. 1.

The wedge 8 has a wedging angle corresponding to that of the slant of the surfaces 12, please see especially FIG. 2. The wedging angle of the wedge 8 and hence the angle included by the two spreading surfaces 12, is within the range of 40° to 80°, preferably about 60°.

Diametrically opposite the location of the slot 13, there is provided a hole or recess 11 through which a pin 7 extends to keep the clamping ring 6 in a substantially fixed position. The pin 7 extends through the upper flange portion of the centering body 4, as well as through the centering member 5, so that the clamping ring 6 cannot be rotated relative to the centering body 4. By these means it is assured that the clamping screw 9 may always properly cooperate with the wedge 8, as will now be described.

The wedge 8 cooperates with said clamping screw 9, the head of which bears against the outer facing surface 14 of the centering body 4. The screw 9 extends through a bore 21 in the upper flange portion of the centering body 4, for cooperation with a threaded hole in the wedge 8. When the screw 9 is tightened, the wedge moves upwardly, thus driving the spring ring 6 radially outwardly against the inner surface of the pipe 1. In this manner the clamping mechanism securely attaches the driving shaft 2 to the drilling pipe 1 in a releasable manner since the threading 3 of the shaft 2 fits into a respective threading centrally in the body 4. In an alternative embodiment, the driving shaft 2 may be provided with a head corresponding to the centering body 4, whereby the threading 3 may be avoided.

In order to secure the drive shaft 2 to the drilling pipe 1, the centering body 4, together with its centering member 5 is inserted into the upper end of the tubular drilling pipe 1, until the shoulder 18 rests against the upper edge of the drilling pipe 1. The centering body 4, 5, assures that the drilling pipe 1 and the drive shaft 2 extend coaxially. Thereafter the screw 9 is tightened, whereby the wedge 8 slides upwardly along the spreading or guiding surfaces 12, thereby forcing the spring resilient clamping ring 6 radially outwardly, whereby the latter presses against the inner surface of the drilling pipe 1 to provide a force transmitting clamping connection. The drive shaft 2 is provided with camming surfaces 15 for applying a wrench or the like. The drive shaft 2 is then connected to a conventional driving mechanism, not shown.

The just described clamping device may be quickly released by simply unscrewing the screw 9, whereby the clamping effect of the clamping ring 6 is removed due to its being under an inherent spring bias effective in the opposite direction as the clamping effect of the wedging action. Once the screw 9 is untightened, the centering body 4 and with it the drive shaft 2 may simply be withdrawn from the drilling pipe 1. The present clamping device is especially suitable for drilling pipes having a large diameter, for example, in the range of 60mm to about 300mm.

Although the invention has been described with reference to specific example embodiments, it will be appreciated, that it is intended to cover all modifications and equivalents within the scope of the appended claims.

What is claimed is:

1. A clamping device for releasably connecting a drive member in a force transmitting manner to a tubular drive member, comprising a centering means concentrically fitting into said tubular drive member, means securing said drive member to said centering means, a ring space in said centering means, clamping ring means located in said ring space, axially extending slot means in said clamping ring means, wedging means axially shiftable in said slot means, clamping screw means cooperating with said wedging means to shift the latter in said slot means whereby said clamping ring means is forced to expand radially outwardly against the inner surface of said tubular driven member when said clamping screw means is tightened.

2. The clamping device according to claim 1, wherein said clamping ring means is sufficiently elastic to return into a position permitting the withdrawal of the clamping device from said tubular driven member when said clamping screw means is released.

3. The clamping device of claim 1, wherein said centering means comprise a first member with a flange extending radially and with a cylinder extending axially, as well as a second member rigidly secured to said cylinder and extending radially whereby said ring space is formed between said flange and said second member so that said flange and said second member define the radially extending surfaces of said ring space, and the cylinder defines the axially extending surface of said ring space.

4. The clamping device of claim 1, wherein said clamping screw means have a head and a threaded shaft, said head bearing against said centering means, said threaded shaft extending into said wedging means, said wedging means having a wedging angle in the range of about 40° to about 80°.

5. The clamping device of claim 4, wherein said wedging angle is about 60°.

6. The clamping device of claim 1, further comprising means fixing the location of said clamping ring means relative to said tubular drive member.

7. The clamping device according to claim 6, wherein said fixing means comprise a hole in said centering means and a further hole in said clamping ring means registering with said first mentioned hole, as well as a pin extending through said hole.

8. The clamping device according to claim 7, wherein said registering holes are located diametrically opposite said axially extending slot means.

9. The clamping device according to claim 1, wherein said clamping ring means is a spring ring of single piece construction.

* * * * *